Aug. 14, 1934.  W. S. FINKEN  1,969,789
PIPE JOINT
Filed Dec. 15, 1933   2 Sheets-Sheet 1
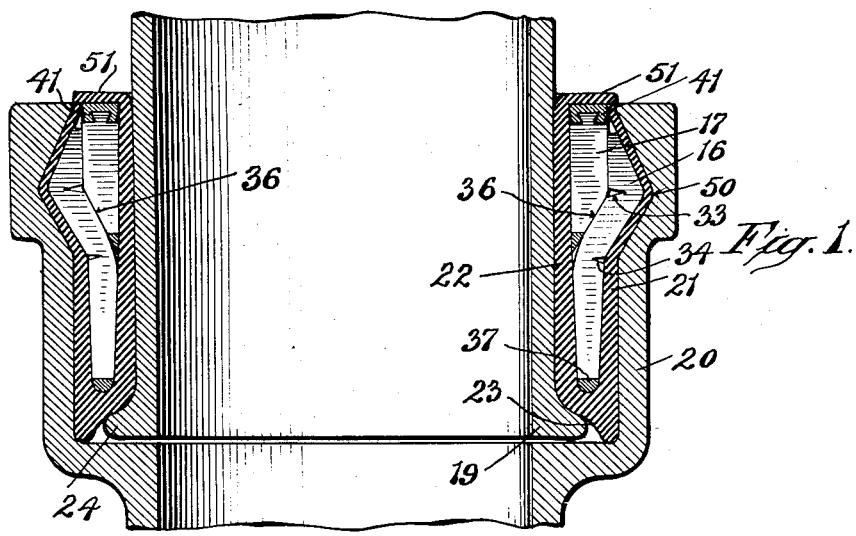
Fig. 1.
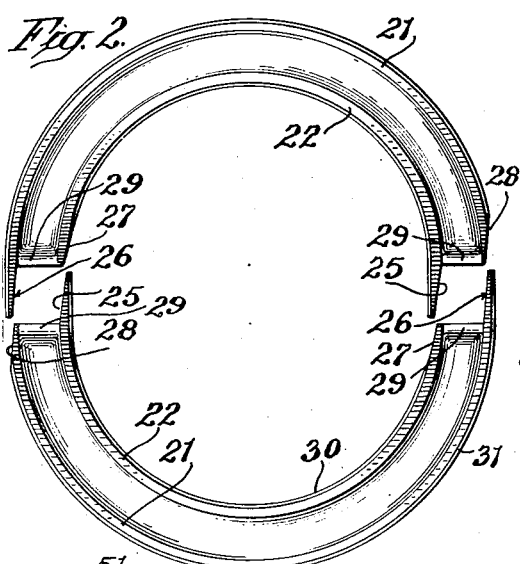
Fig. 2.
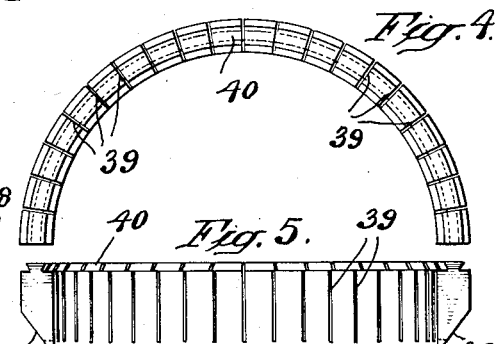
Fig. 4.
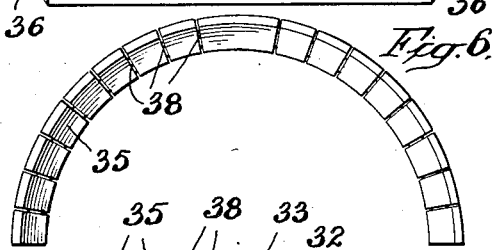
Fig. 5.
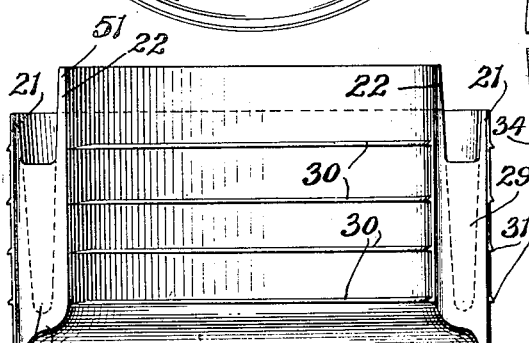
Fig. 3.
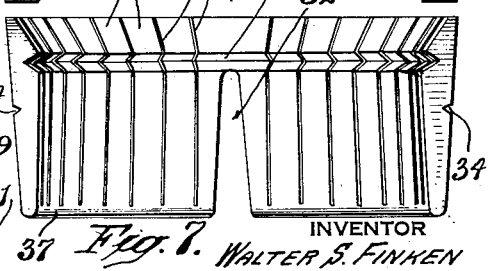
Fig. 6.
Fig. 7.
INVENTOR
WALTER S. FINKEN
BY Harry Radzinsky
ATTORNEY Aug. 14, 1934.     W. S. FINKEN     1,969,789
PIPE JOINT
Filed Dec. 15, 1933    2 Sheets-Sheet 2
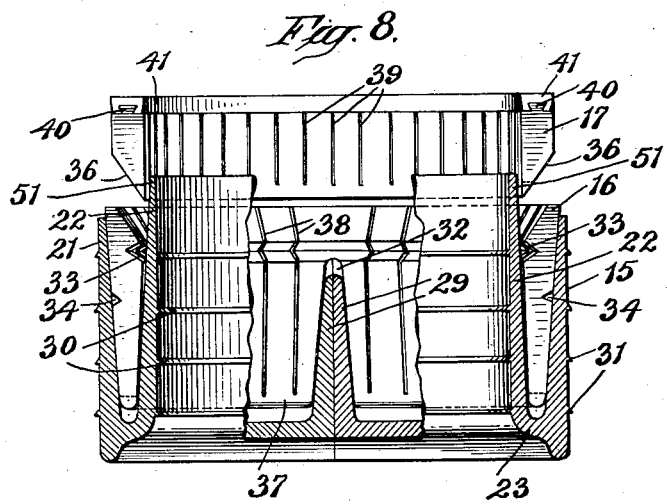
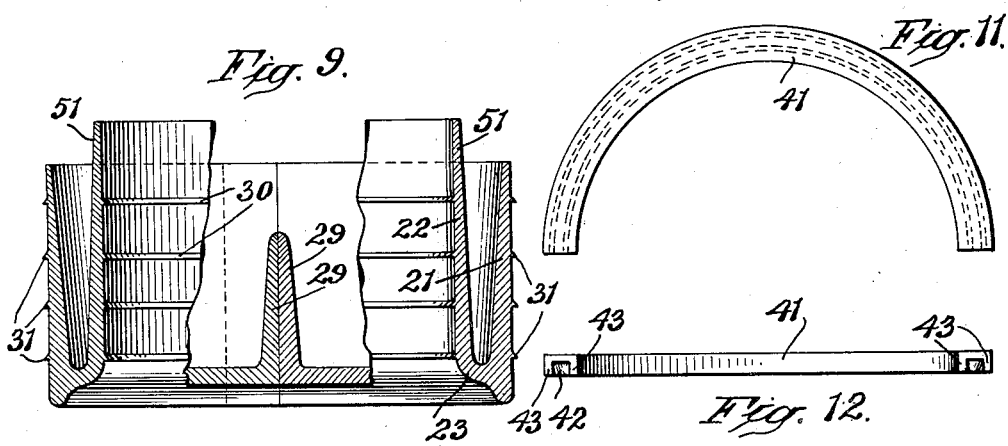
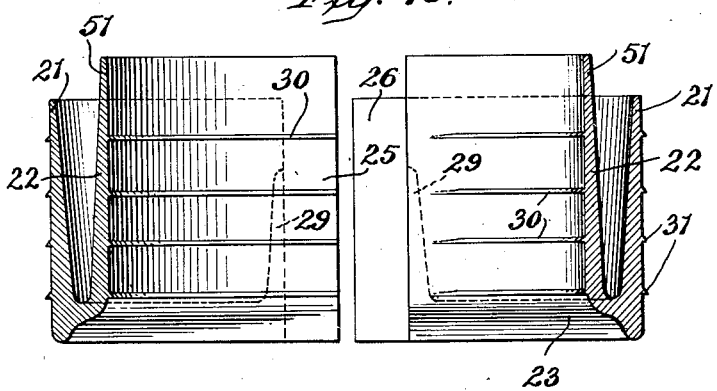
INVENTOR
WALTER S. FINKEN
BY
Harry Radzinsky
ATTORNEY Patented Aug. 14, 1934

1,969,789

UNITED STATES PATENT OFFICE 1,969,789

PIPE JOINT

Walter S. Finken, New York, N. Y.

Application December 15, 1933, Serial No. 702,438

10 Claims. (Cl. 285—115)

This invention relates to an improvement in a sealing and locking device for pipe joints particularly applicable to pipes of the type known in the plumbing art as "soil" pipes, which are generally made of cast iron. The ends of pipes of this character are shaped complementarily so that they fit together, one end having what is termed in the art a "bell" and the other end being formed with an enlarged mouth portion commonly called a "spigot". In practice, the spigot fits into the bell, the joint between the pipes being usually caulked with oakum and molten lead.

The object of this invention is to provide a means for hermetically sealing the type of joint described above, without the use of molten lead, oakum and other packings of the same general nature heretofore used.

A further object of the invention is to provide an "all-metallic" joint which will be more uniformly liquid-tight than is possible to secure through the use of other types of joints known at the present time.

A further object of the invention is to provide a means for permanently locking the joint elements in position so that the two pipe ends are prevented from working loose and separating by vibration or jarring, or by longitudinal stress or strain, or by "creeping" caused by expansion and contraction due to temperature changes.

With these objects, and such other objects as may hereinafter appear in view, I have devised the particular arrangement of parts set forth below and more particularly pointed out in the claims appended hereto.

In the accompanying drawings, Fig. 1 is a vertical sectional view of a pipe joint constructed in accordance with my invention; Fig. 2 is a plan view of the two semi-annular portions of the sealing cushion; Fig. 3 is a front elevation of one of these semi-annular members; Fig. 4 is a plan view of one of the portions of the locking wedge; Fig. 5 is a front view of the wedge shown in Fig. 4; Fig. 6 is a plan view of one of the halves of the caulking wedge; Fig. 7 is a front view of the same; Fig. 8 is a sectional view, with parts broken away showing the manner in which the sealing cushion, the caulking wedge and the locking wedge are placed together in the process of forming the joint; Fig. 9 is a sectional view, similar to that of Fig. 8, of the sealing cushion alone; Fig. 10 is a sectional view through the two halves of the sealing cushion, with the same separated to show the beveled ends; Fig. 11 is a plan view of one of the halves of the bonding collar; and Fig. 12 is a front elevation of the same.

The improved joint is formed by four main elements consisting of a sealing cushion 15, a caulking wedge 16; a locking wedge 17 and a bonding collar 41. The manner in which these elements co-operate to form a tight joint between two pipe ends will be described.

At 19 is shown the spigot end of a pipe, which fits within the bell 20. The sealing cushion 15 disclosed in detail in Figs. 2, 3, 9 and 10 is composed of two hollow, preformed, semi-annular segments of any soft, ductile and malleable material, such as lead, or a compound of lead or other suitable material. The sealing cushion is formed with two concentric walls, the outer shorter wall being indicated at 21, the inner higher wall being indicated at 22. At their lower ends, the two walls 21 and 22 are integrally connected by the portion 23 which is curved to conform to the upper part of the bead 24 formed on the end of the spigot portion 19. One end of the inner wall 22 on each segment of the sealing cushion is provided with a beveled projecting portion 25 (see Fig. 2) while the opposite end of the outer wall 21 is provided with a similar projecting part 26. When the two semi-annular segments of the sealing cushion are placed together between the outer surface of the spigot 19 and the inner surface of the bell 20, the projecting beveled ends 25 will overlap beveled surfaces 27 provided on the inner wall of the two segments, as shown in Fig. 2, while the projecting end portions 26 on the outer wall will overlap beveled surfaces 28 provided on the outer wall 21.

Through this arrangement, the two semi-annular segments of the sealing cushion 15 are united to form a complete concentric ring with overlapping ends. The recessed space or channel located between the walls 21 and 22 of each semi-annular section of the sealing cushion is closed by integral end walls or plates 29 which have their upper ends terminating below the upper ends of the walls 21 and 22. The end walls 29 on one of the semi-annular sections lie in abutment with similar end walls provided on the other semi-annular section, as clearly shown in Figs. 8 and 9. It will also be seen that the inner surface of the walls 21 and 22 converge toward the bottom of the channel between these walls so that the internal channel between the walls is tapered. On the inner surface of the inner wall 22 is a number of spaced, longitudinally extending, integral protruding ribs 30 which are provided for the purpose of being compressed into the rough, irregular surface of the spigot portion 19 of the pipe end. Similar ribs, shown at 31, are formed on the outer surface of the outer wall 21, these ribs being compressed against the inner face of the bell portion 20 of the pipe.

The caulking wedge 16 is shown in detail in Figs. 6 and 7, and the same consists of two semi-annular segments of tapering wedge formation, shaped to fit within the tapered channel located between the walls 21 and 22 of the sealing cushion. This wedge 16 is preferably made of a suitable composition metal harder than that of which the sealing cushion is composed, such as brass, or the like. The metallic requirements are that the metal used for this wedge shall be sufficient to withstand a hammer blow without deformation, with enough ductability to permit bending without rupturing the grain. Midway between the ends of each of the segments of the caulking wedge is located an angular wedge-shaped aperture 32 with the larger end thereof located at the bottom of the wedge. When the two segments of the wedge 16 are placed together and forced within the channel of the sealing cushion 21, each of the apertures 32 straddles two of the end walls 29 of the sealing cushion and holds them together. In this way, the points of juncture of the two segments of the caulking wedge are staggered with respect to the joints between the two segments of the sealing cushion. The tapered shape of the apertures 32 serve to tightly draw the end walls 29 which it embraces, into firm contact, providing an effective seal between them. On its inner face, near the upper end thereof, each of the wedge sections 16 is provided with an angular, longitudinally extending groove 33 to facilitate the collapse or bending of the wedge to the position substantially shown in Fig. 1 when the locking wedge 17 is inserted. A similar longitudinal groove 34 is provided in the outer face of each of the wedge segments 16. The inner face of the wedge segments adjacent the top thereof are angled as shown at 35, to accommodate the locking wedge 17 as will be hereinafter described. The angle of the portion 35 differs from the angular inclination 36 on the locking wedge 17 so that when the angular portion 36 descends it exerts a constant pressure on the base of the angular portion 35 causing it to bend outward. The caulking wedge 16 is cut at spaced intervals, as indicated at 38, for almost its entire vertical depth, for the purpose of permitting the wedge, under the blow of a hammer, to split up into a number of segments, if necessary.

When the wedge so splits, each segment of it may be driven home in the channel of the sealing cushion, to a depth contingent upon the irregular surface of the bell and spigot pipe casting into which it is inserted. When the splitting of the caulking wedge occurs in the manner explained, the uncut portion 37 of the caulking wedge shears through, should any one segment or split section be free to descend below its adjacent member. The cross-sectional area of the caulking wedge 16 is greater than that of the channel in the sealing cushion into which it is inserted so that when the caulking wedge is forced in position in said channel the vertical side walls 21 and 22 of the sealing cushion are forced apart to conform to the space between the bell and spigot.

The locking wedge 17, shown in detail in Figs. 4 and 5, consists of two semi-annular wedge-shaped segments of a suitable composition metal, such as brass. Each segment is split at intervals, as indicated at 39 for almost the entire depth of the segment, in the same manner as the caulking wedge 16 and for the same purpose. The top of the locking wedge is formed with the male member 40 of a dove-tail joint, to receive a bonding collar 41, shown in detail in Figs. 11 and 12.

The bonding collar consists of two semi-annular segments of a ductile material, such as lead, and is provided at its base with a channel 42 which fits over the dove-tail member 40 on the locking wedge, and when it is applied to the locking wedge the short vertical walls 43 are compressed toward one another by applying suitable pressure, either manually or by suitable mechanism so that they assume the formation of the dovetail member 40. This bonding collar, when applied in the manner indicated, affords a means by which any irregularity in the surfaces of the bell and spigot may be caulked; and prevents the segmental formation of the top of the locking wedge 17 from becoming loosened or separated.

From the foregoing, the manner in which the joint is formed, will now be readily understood. The spigot end of the pipe is inserted in the bell 20 in the usual manner. The sealing cushion is then forced down in position and since its lower end portion 23 generally conforms in shape to the bead 24 on the spigot end of the pipe, it will act to accurately center the spigot end of the pipe within the bell. The caulking wedge 16 is then placed within the channel between the walls 21 and 22 of the sealing cushion and is driven home, the split portions of the caulking wedge enabling it to intimately accommodate itself to the channel and also to force the walls of the channel into intimate contact with the walls of the bell and spigot portions of the piping. When the caulking wedge is forced down, its tapered apertures 32 straddle the end walls 29 of the sealing cushion as indicated in Fig. 8 where the caulking wedge has been partly forced down in the channel of the sealing cushion. This action causes the overlapping tapered portions 25, 26, 27 and 28 of the sealing cushion to assume their intended positions of overlap thus hermetically sealing the entire sealing cushion by the simultaneous action of the radial and peripheral tapers of the caulking wedge 16. The locking wedge 17 is next driven home and as this is done the caulking wedge 16 is caused to bend or buckle along the grooves 33 and 34 so that it forces or distorts the outer wall 21 of the sealing cushion outwardly, as indicated in Fig. 1 into intimate contact with the groove 50 provided in the inner face of the bell of the pipe. After the locking wedge has been placed in position, the projecting upper end portion 51 of the inner wall 22 of the sealing cushion is bent downwardly to overlie the top of the locking wedge collar 41, and it acts to secure the locking wedge in position and prevents it from working loose.

What I claim is:

1. In a pipe joint, the combination of, a sealing member composed of several segments fitted together in overlapped relationship to form an annulus, said segments each having spaced walls defining a channel between them and a closed bottom, a caulking member fitted into the channel, a wedge also fitted into the channel and adapted to distort the caulking member and one of the walls of the sealing member, the other wall of the sealing member having an upwardly extended portion adapted to be bent over on top of the wedge to hold the wedge in the channel.

2. In a pipe joint, the combination of a channelled member of relatively soft material, a tapered member of harder material lying in the channel, a wedge forced into the channel at one side of the tapered member so that the tapered member is distorted and is caused to distort one of the walls of the channel, the channelled member having a second wall of greater height than the distorted wall so that a portion of the higher wall may be bent over on top of the wedge to retain the same in position in the channel.

3. In a pipe joint, a channel-shaped sealing member composed of two semi-annular segments of soft metal provided with spaced concentric walls and a closed bottom, said segments having walls closing their ends, said end walls being located in abutment when the segments are placed together to form an annulus, means inserted in the channel for expanding the walls of the sealing member against the bell and spigot portions of piping, said means having parts embracing the abutted end walls of the segments and holding the segments together.

4. In a pipe joint, a channel-shaped sealing member adapted to lie in the space between the bell and spigot portions of piping, said sealing member being composed of several segments provided with spaced concentric walls and a closed bottom, said segments having end walls closing their ends, said end walls being located in abutment when the segments are placed together to form an annulus, means inserted in the channel for expanding the walls of the segments against the bell and spigot portions of the piping, said means comprising semi-annular tapered elements provided with slots straddling the abutted end walls of the segments and holding the same together.

5. In a pipe joint, a channel-shaped sealing member adapted to lie in the space between the bell and spigot portions of piping, said sealing member being composed of several segments provided with spaced concentric walls and a closed bottom, the segments having end walls located in abutment when the segments are placed together to form an annulus, means inserted in the channel for expanding the walls of the segments against the bell and spigot portions of the piping, said means comprising semi-annular tapered elements provided with tapered slots straddling the abutted end walls of the segments and holding the same together, and a wedging member inserted in the channel for distorting a portion of the semi-annular tapered elements laterally.

6. In a pipe joint, a channel-shaped sealing member adapted to lie in the space between the bell and spigot portions of piping, said sealing member being composed of two semi-annular segments of ductile material and provided with spaced concentric walls and a closed bottom, each of said segments having end walls, the end walls on one segment lying in abutment with those on the other segment when the two segments are placed together to form an annulus, means adapted for insertion in the channel for expanding the walls of the segments laterally to force said walls into intimate contact with the bell and spigot portions of the piping, said expansion means comprising a pair of semi-annular tapered elements provided with tapered slots straddling the abutted end walls of the segments and holding the segments together, a wedging member inserted in the channel for distorting a portion of the semi-annular tapered elements laterally, and an angularly bent top portion on one of the sealing member walls overlying the top of the wedging element and holding it in wedging position in the channel.

7. In a pipe joint, a channel-shaped sealing member adapted to lie in the space between the bell and spigot portions of piping, said sealing member being composed of two semi-annular segments of ductile material and provided with spaced concentric walls and a closed bottom, the faces of said walls which contact with the bell and spigot portions of the piping being provided with longitudinally extending compressible ribs, each of said segments having end walls, the end walls on one segment lying in abutment with those on the other segment when the two segments are placed together to form an annulus, means adapted for insertion in the channel in the segments for expanding the walls of the segments laterally to force said walls into intimate contact with the bell and spigot portions of the piping, said means comprising a pair of semi-annular transversely split tapered elements provided with tapered slots straddling the abutted end walls of the segments and holding the segments together, a transversely split wedging member inserted in the channel for distorting a portion of the semi-annular tapered elements laterally, and an angularly bent top portion on one of the sealing member walls for overlying the top of the wedging element and holding it in wedging position in the channel.

8. In a pipe joint, a sealing member composed of a preformed channel-shaped element made of ductile material and consisting of several segments fitted together to form an annulus, and means inserted in the channel of the segments to expand the walls thereof, said expansion means having means for holding together the meeting ends of the segments.

9. In a pipe joint, a sealing member consisting of several channel-shaped segments placed together to form an annulus, said segments having a pair of spaced walls defining the channel between them, means for insertion within the channel to expand the walls into contact with pipe surfaces, said means comprising wedge-shaped segments having longitudinally extending, weakened bending lines on their inner and outer faces, and wedging means operative against said wedge-shaped segments to cause them to buckle on said bending lines.

10. In a pipe joint, the combination of, a sealing member composed of several soft metal segments fitted together with their ends in overlapping relationship to form an annulus, said segments having end walls and spaced side walls defining a channel between them, the outer faces of said side walls being longitudinally ribbed, tapered segmental elements fitted into the channel, said tapered elements having slots straddling the end walls of the soft metal segments, said tapered elements having longitudinally extending, weakened bending lines on their inner and outer faces, a wedge fitted into the channel and adapted to cause the tapered elements to buckle on their weakened lines, one of the walls of the sealing member having its upper end bent over on top of the wedge to hold the wedge in the channel.

WALTER S. FINKEN.